US007156121B2

United States Patent
Cox et al.

(10) Patent No.: US 7,156,121 B2
(45) Date of Patent: Jan. 2, 2007

(54) VALVE POSITION MONITOR AND METHOD OF USE

(76) Inventors: Christopher L. Cox, 241 Farmhouse La., Palmyra, PA (US) 17078; Wayne R. Houck, 3887 Pawnee Rd., Columbia, PA (US) 17512

( * ) Notice: Subject to any disclaimer, the term of this patent is extended or adjusted under 35 U.S.C. 154(b) by 0 days.

(21) Appl. No.: 11/006,077

(22) Filed: Dec. 7, 2004

(65) Prior Publication Data

US 2005/0127200 A1 Jun. 16, 2005

Related U.S. Application Data

(60) Provisional application No. 60/529,370, filed on Dec. 11, 2003.

(51) Int. Cl.
*F16K 37/00* (2006.01)
(52) U.S. Cl. .................... 137/554; 137/15.01
(58) Field of Classification Search ............. 137/15.01, 137/554
See application file for complete search history.

(56) References Cited

U.S. PATENT DOCUMENTS

| | | | |
|---|---|---|---|
| 4,340,086 A * | 7/1982 | Hemm et al. ............ | 137/554 |
| 4,494,565 A | 1/1985 | Sinclair et al. | |
| 4,494,566 A | 1/1985 | Sinclair et al. | |
| 5,144,977 A * | 9/1992 | Eggerton et al. ........ | 137/554 |
| 5,975,486 A | 11/1999 | Dettmann | |
| 6,173,731 B1 | 1/2001 | Ottliczky | |
| 6,257,276 B1 | 7/2001 | Muller et al. | |
| 6,286,547 B1 | 9/2001 | Dettmann | |
| 6,286,548 B1 | 9/2001 | Dettmann | |
| 6,650,211 B1 | 11/2003 | Pimouguet | |
| 2002/0195148 A1 | 12/2002 | Muller et al. | |
| 2003/0110868 A1 | 6/2003 | Muller et al. | |

FOREIGN PATENT DOCUMENTS

| | | |
|---|---|---|
| DE | 299 17 083 U1 | 12/1999 |
| EP | 0 961 066 A2 | 12/1999 |
| EP | 1 089 027 A2 | 4/2001 |

OTHER PUBLICATIONS

Brochure entitled "Direct Mount Position Indicator for Rotary NAMUR Actuators Series NR1 NR2", Asco Valve Monitoring Systems, pp. 1-0-2.5.
Brochure entitled "Westlock Valve Monitoring System", Conbraco, pp. 30-31.
"New Prism Series Linear Valve Monitors", StoneL Corporation, pp. 1-3, Oct. 1, 2003.
StoneL Corporation, Brochure—"The Prism Series", pp. 32-35, May 12, 2006.

* cited by examiner

*Primary Examiner*—A. Michael Chambers
(74) *Attorney, Agent, or Firm*—RatnerPrestia

(57) ABSTRACT

A valve system includes a valve assembly, and an actuator for operating the valve assembly. The actuator includes a housing and a shaft extending through the housing. The shaft is moveable within a range of motion during operation of the valve assembly. The valve system also includes a valve position monitor for monitoring the position of the valve assembly. The valve position monitor includes at least one trigger and a corresponding stationary stop. The trigger is moveable with respect to the stationary stop within a range of motion. The range of motion of the trigger corresponds to at least a portion of the range of motion of the shaft. At least a portion of the range of motion of the trigger extends into the housing of the actuator.

8 Claims, 4 Drawing Sheets

VALVE POSITION MONITOR AND METHOD OF USE

This application claims priority of U.S. Provisional Patent Application Ser. No. 60/529,370 filed Dec. 11, 2003.

FIELD OF THE INVENTION

This invention relates to valve systems, and more particularly, to valve position monitors in actuated valve systems.

BACKGROUND OF THE INVENTION

Various industries utilize actuated valve systems. For example, in the pharmaceutical manufacturing industry, actuated valve systems are utilized to control fluid flow. Such actuated valve systems are also used in a variety of alternative industries, including biotechnology industries, laboratories, etc. In such industries it is desirable to know the status of the valve (i.e., open or closed). Various valve position indicators are available for use on pneumatically actuated linear valves. However, these indicators suffer from a number of deficiencies.

One problem is that the indicators are typically undesirably quite large as compared to the size of the valve's actuator. Additionally, because such indicators are often integrated into existing valve systems, portions of the indicator are exposed. Such exposure can lead to damage to the indicator or remainder of the valve system during certain operations (e.g., during a process washdown).

Yet another problem with existing position indicators is the potential for false position feedback. In many instances, minor fluctuations in actuator pressure, diaphragm wear inside the valve, or external stresses on the switch package can cause misalignment between a signal trigger and a sensor or switch. This misalignment can cause the operator to get a false position signal.

Thus, it would be desirable to provide a actuated valve indicator system overcoming one or more of the above-described deficiencies.

SUMMARY OF THE INVENTION

In accordance with an exemplary embodiment of the present invention, a valve system is provided. The valve system includes a valve assembly and an actuator for operating the valve assembly. The actuator includes a housing and a shaft extending through the housing. The shaft is moveable within a range of motion during operation of the valve assembly. The valve system also includes a valve position monitor for monitoring the position of the valve assembly. The valve position monitor includes at least one trigger and a corresponding stationary stop. The trigger is moveable with respect to the stationary stop within a range of motion. The range of motion of the trigger corresponds to at least a portion of the range of motion of the shaft. At least a portion of the range of motion of the trigger extends into the housing of the actuator.

In accordance with another exemplary embodiment of the present invention, a method of assembling a valve system including a valve assembly is provided. The method includes providing an actuator for operating the valve assembly, where the actuator includes a housing and a shaft extending through the housing, and the shaft is moveable within a range of motion during operation of the valve assembly. The method also includes coupling a valve position monitor for monitoring the position of the valve assembly to the actuator, where the valve position monitor includes at least one trigger and a corresponding stationary stop. The trigger is moveable with respect to the stationary stop within a range of motion, where the range of motion of the trigger corresponds to at least a portion of the range of motion of the shaft. The coupling step includes extending at least a portion of the range of motion of the trigger into the housing of the actuator.

BRIEF DESCRIPTION OF THE DRAWINGS

Exemplary embodiments of the invention will be described with reference to the drawings, of which.

DETAILED DESCRIPTION OF THE INVENTION

Preferred features of embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

As will be explained herein, according to certain exemplary embodiments of the present invention, an electric field is emitted (e.g., using a DC supply such as 24 V DC) and sensed by at least one proximity sensor. When the at least one sensor senses the electric field at or beyond a certain threshold level, the sensor provides a signal indicating that the valve is in a given position (e.g., open, closed, partially open, partially closed, etc.). Is Alternatively, if the electric field has collapsed (e.g., because of a ferrous material moving into a position to violate the field), the at least one sensor senses the electric field at or below another threshold level, and the sensor provides a signal indicating that the valve is in another position (e.g., open, closed, partially open, partially closed, etc.).

The output signals provided from the sensor(s) may be used to actuate a local indication flag/beacon at the valve, and/or may be transmitted remotely (e.g., to a central control system such as a DCS). The output signals may be current-based. For example, based on the level of the sensed electric field, a higher or lower amount of current is provided in the output signals from the sensor(s). This amount of current equates to a position of the valve.

As will be explained herein, the valve of the present invention is assembled by an operator such that the valve position monitoring device advantageously realigns itself. Further, a valve position monitoring device with a low profile is provided, thereby resulting in a actuated valve system with a low profile. Further still, a modular valve position monitoring device that is integrated with the valve's actuator is provided.

Figure 1:
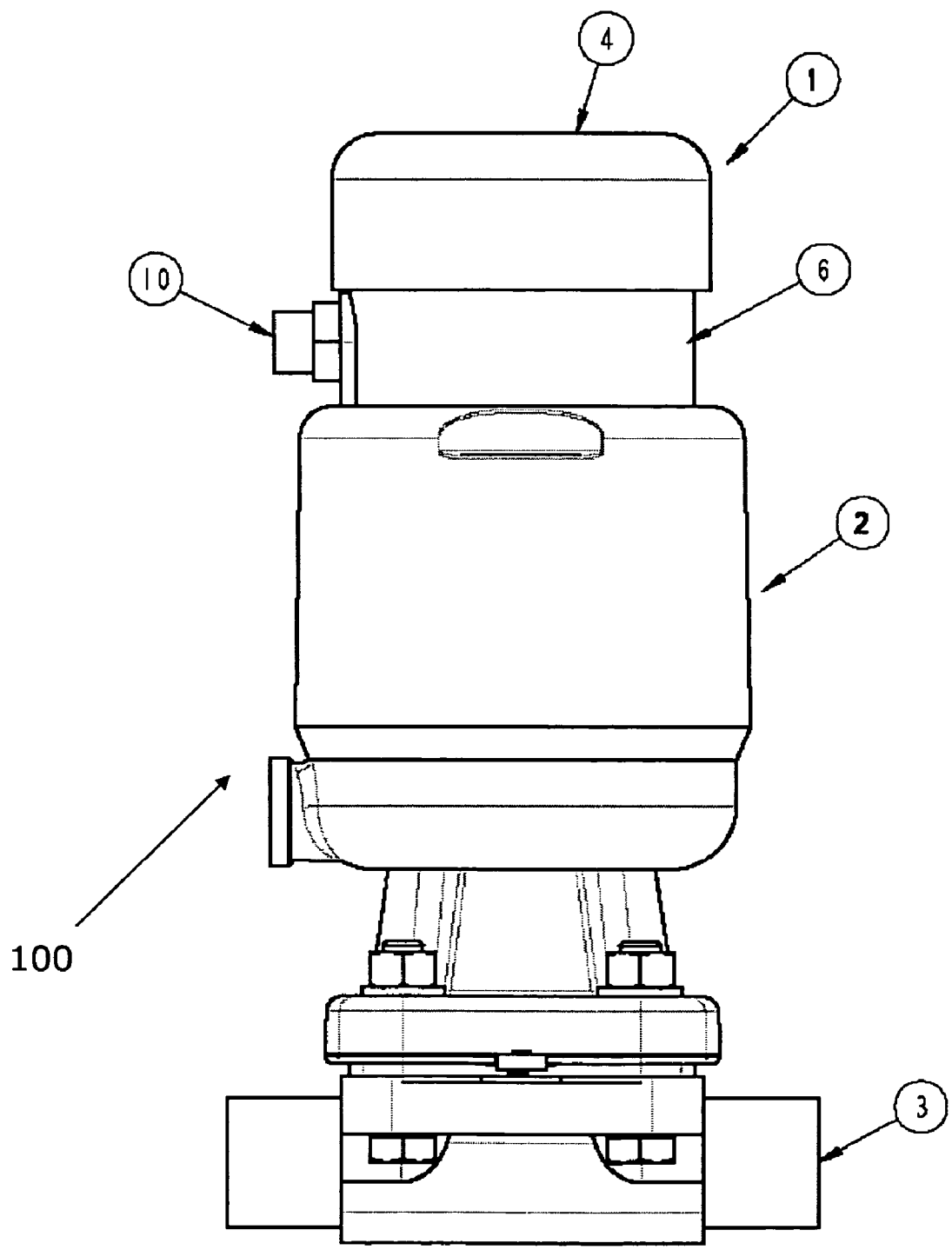
FIG. 1 is a front view of an actuated valve system including a valve position monitoring device in accordance with an exemplary embodiment of the present invention.

FIG. 1 is a front view of an actuated valve system 100. Actuated valve system 100 includes valve assembly 3 (i.e., the valve itself), actuated valve assembly 2 (i.e., a valve actuator), and valve position monitoring device 1. Actuated valve assembly 2 operates valve assembly 3. For example, actuated valve assembly 2 is a pneumatically actuated assembly. Valve position monitoring device 1 (a.k.a. a "Switch Pack") includes sensor carrier area 6 and cover 4. Also illustrated in FIG. 1 is connector 10 (e.g., an M12 connector), which receives a number of conductors for signaling and other functions.

Figure 2:
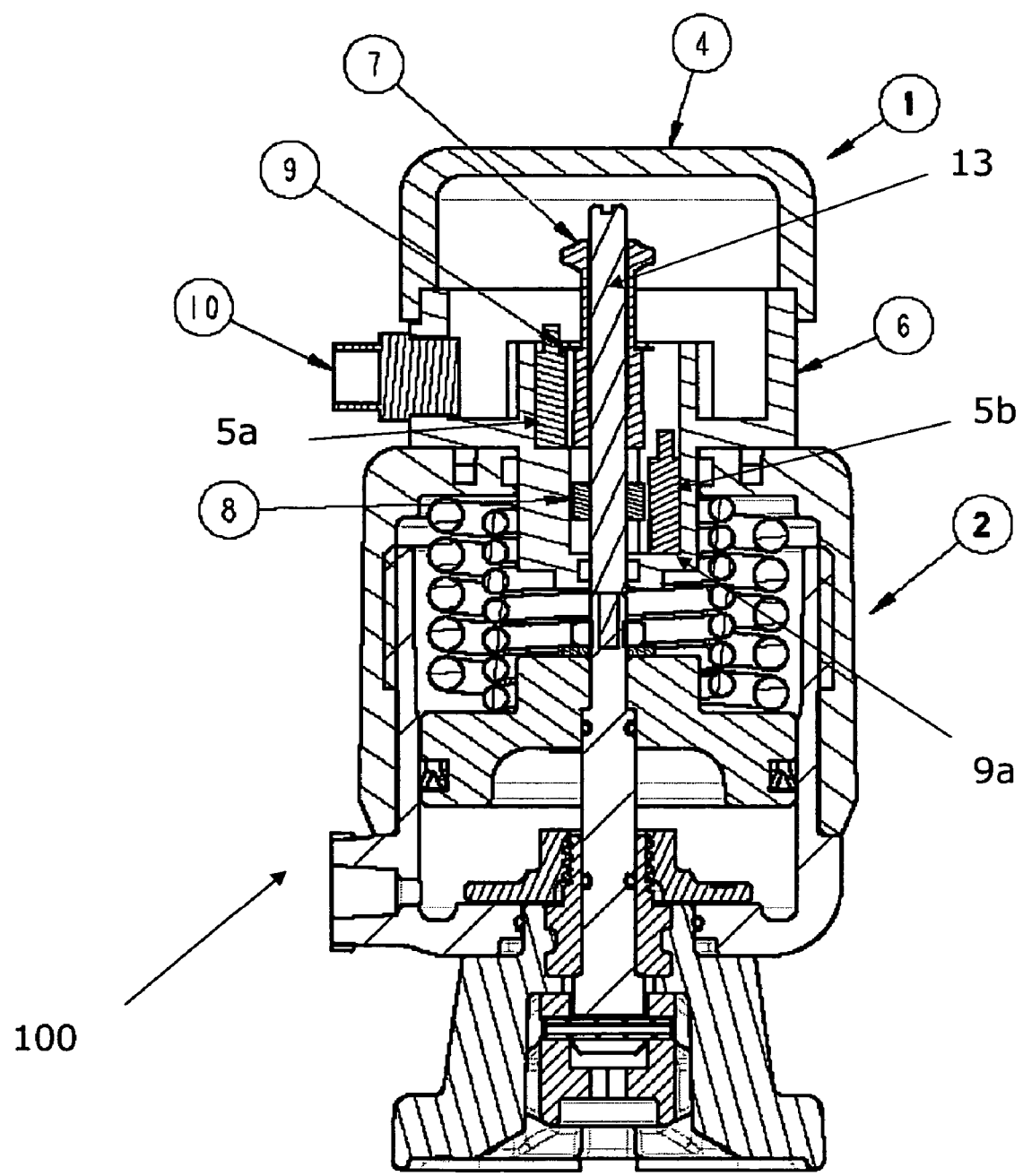
FIG. 2 is a cut-away front view of an actuated valve system in an open position including a valve position monitoring device in accordance with an exemplary embodiment of the present invention.

FIG. 2 is a cut-away front view of actuated valve system 100 in an open position, with valve assembly 3 substantially removed. As illustrated in FIG. 2, pneumatically actuated valve assembly 2 is integrated with valve i 5 position monitoring device 1. More specifically, as will be explained herein, a portion of valve position monitoring device 1 extends into pneumatically actuated valve assembly 2. This advantageously results in an actuated valve system having a lower profile.

Valve position monitoring device 1 includes sensor carrier 6, cover 4, OPEN trigger 7, CLOSED trigger 8, proximity sensors 5 (i.e., OPEN sensor 5a and CLOSED sensor 5b), an OPEN stop 9, and shaft 13 (i.e., indicating spindle 13). In embodiments using a ferrous material to interrupt an electric field as described above, the triggers would include such a material. In the exemplary embodiment illustrated in FIG. 2, OPEN trigger 7 and CLOSED trigger 8 are mounted on shaft 13 and are held in place via friction.

When actuated valve system 100 is cycled, shaft 13 moves up and/or down) within its range of motion. To a certain extent, OPEN trigger 7 and CLOSED trigger 8 move along with shaft 13; however, at certain positions, movement of the triggers is impeded by "stops." For example, OPEN trigger 7 may move upwardly along with shaft 13 until OPEN trigger 7 is "stopped" by OPEN stop 9. Likewise, CLOSED trigger may move downwardly along with shaft 13 until CLOSED trigger is "stopped" by CLOSED stop 9a. Thus, OPEN trigger 7 and CLOSED trigger 8 each move within their respective ranges of motion that are within the range of motion of shaft 13.

Figure 4:
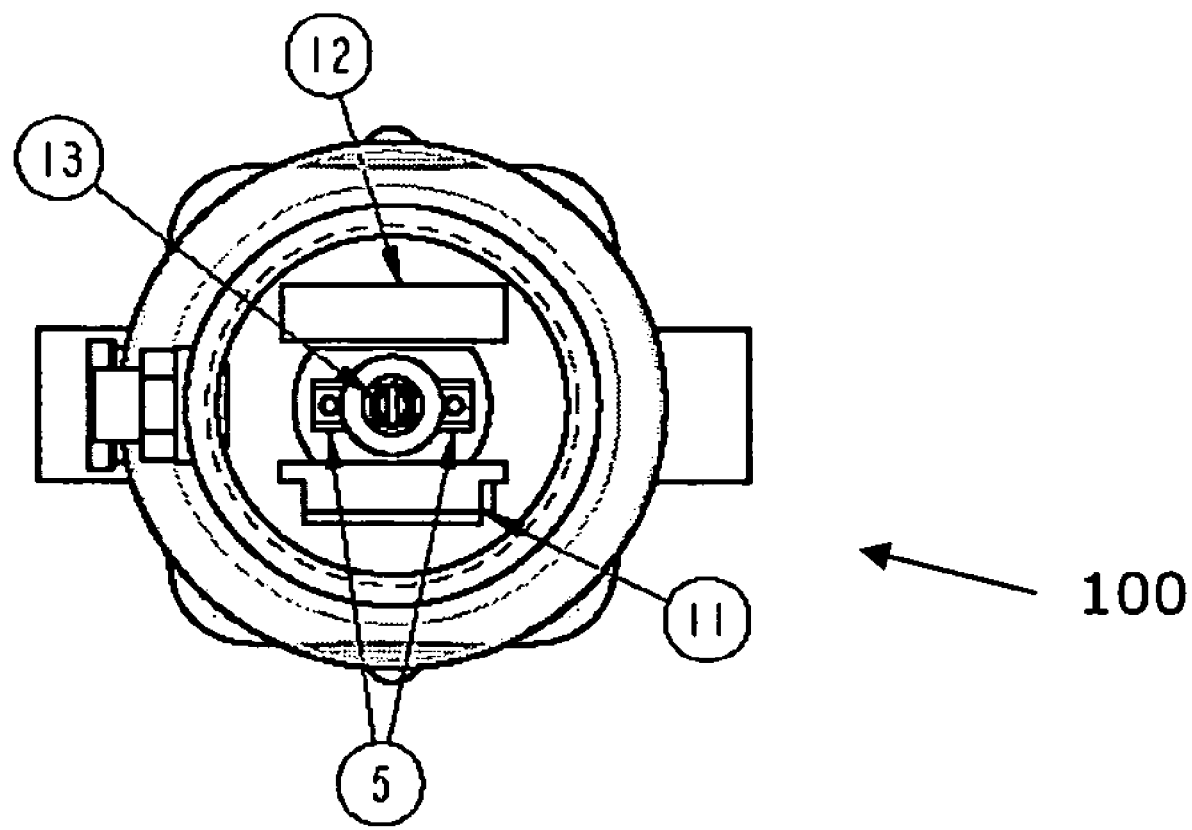
FIG. 4 is a cut-away top view of an actuated valve system including a valve position monitoring device in accordance with an exemplary embodiment of the present invention.

Valve position monitoring device 1 may also include solenoid 12 (e.g., a 3/2 solenoid illustrated in FIG. 4) for actuating the valve, and printed circuit board 11 (also illustrated in FIG. 4). For example, printed circuit board 11 provides an interconnection point between sensor(s) 5 and output wiring transmitting the valve position. Printed circuit board 11 may also act as an interconnection point between solenoid 12 and associated control wiring. Thus, wiring between internal components of valve position monitoring device 1 (e.g., sensor(s) 5, solenoid 12) and external circuitry (e.g., control circuitry, monitoring circuitry, control system interface circuitry) is brought into actuated valve system 100 via field wiring extending through connector 10.

Printed circuit board 11 may also include electronics for facilitating monitoring and/or control via a network bus system for use with a control system (e.g., a distributed control system, a man-machine interface, etc.). For example, such a network bus system may be AS-Interface protocol or DeviceNet protocol compatible.

In FIG. 2, the valve assembly 3 (not illustrated) is in the OPEN position. As shown in FIG. 2, OPEN trigger 7 is in contact with OPEN stop 9, and as such, OPEN trigger 7 is at the highest point in its range of motion. Further, the lower portion of OPEN trigger 7 is visibly aligned with the lower portion of OPEN sensor 5a. Thus, it is clear that valve assembly 3 (not illustrated) is in the OPEN position. Further, as shown in FIG. 2, closed trigger 8 is not at the bottom of its range of motion (closed trigger 8 is not in contact with CLOSED stop 9a), and the lower portion of CLOSED trigger 8 is not visibly aligned with the lower portion of CLOSED sensor 5b. Thus, it is clear that valve assembly 3 (not illustrated) is not in the CLOSED position.

Figure 3:
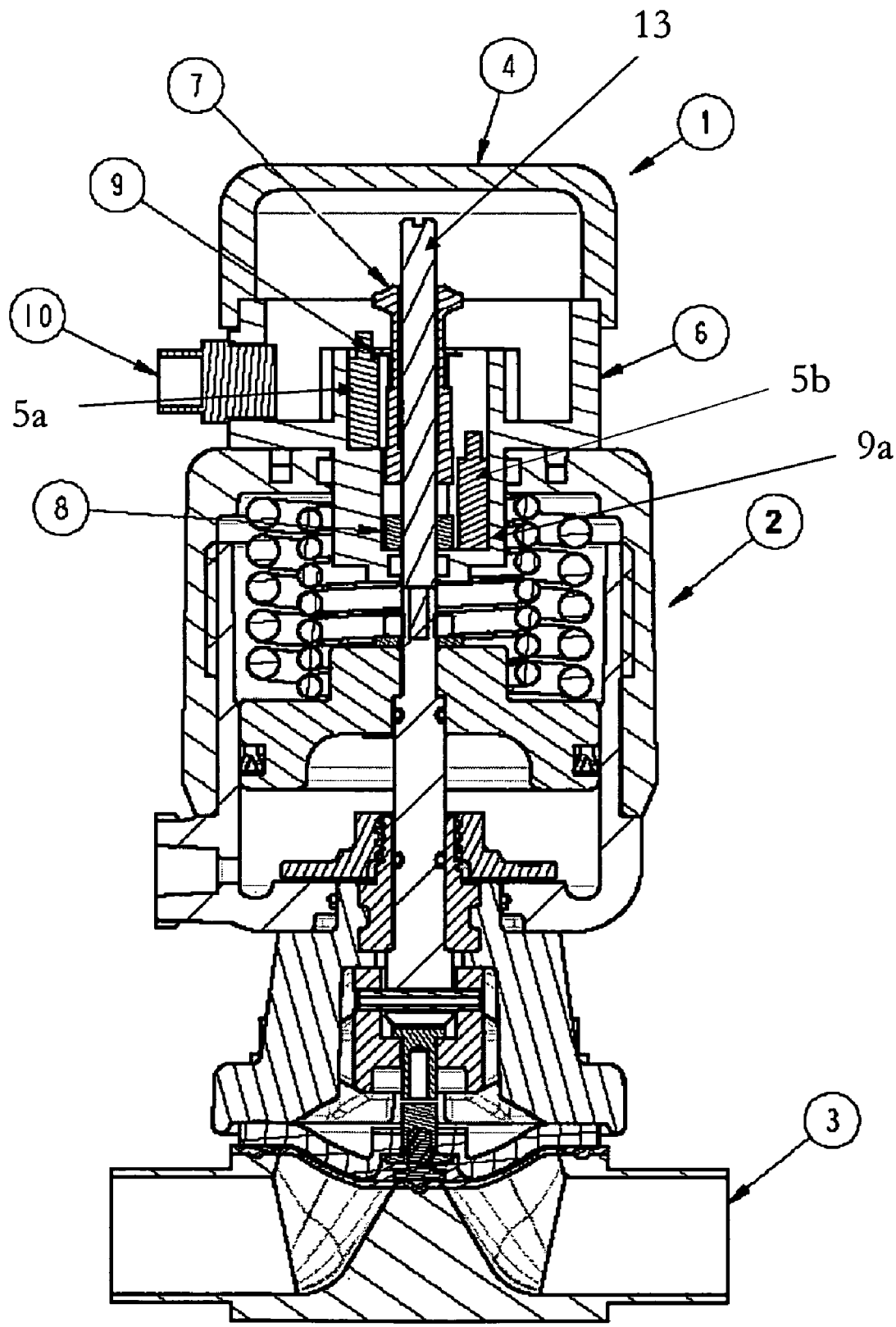
FIG. 3 is a cut-away front view of an actuated valve system in a closed position including a valve position monitoring device in accordance with an exemplary embodiment of the present invention.

In contrast, in FIG. 3, the valve assembly 3 is in the CLOSED position. As shown in FIG. 3, closed trigger 8 is at the bottom of its range of motion (closed trigger 8 is in contact with CLOSED stop 9a), and the lower portion of CLOSED trigger 8 is visibly aligned with the lower portion of CLOSED sensor 5b. Thus, it is clear that valve assembly 3 is in the CLOSED position. Further, as shown in FIG. 3, OPEN trigger 7 is not in contact with OPEN stop 9, and as such, OPEN trigger 7 is not at the highest point in its range of motion. Further, the lower portion of OPEN trigger 7 is visibly not aligned with the lower portion of OPEN sensor 5a. Thus, it is clear that valve assembly 3 is not in the OPEN position.

As provided above, in certain embodiments of the present invention, an electric field generated through at least one conductor extending through connector 10 (conductors are not shown in the Figures) provides a signal for receipt by sensors 5. For example, in FIGS. 2–3, a lower portion of each of sensor 5a and 5b include a sensing portion for sensing the electric field.

Each of triggers 7 and 8 include a ferrous material (e.g., in the form of a ferrous band). For example, in the embodiments illustrated in FIGS. 2–3, the lower portion of OPEN trigger 7 includes such a ferrous band, and substantially the entire cross section of CLOSED trigger 8 includes such a ferrous band. Thus, in FIG. 2, the ferrous band included in OPEN trigger 7 is blocking the sensing portion of OPEN sensor 5a, thereby collapsing the electric field, and resulting in an OPEN signal being transmitted. Likewise, in FIG. 2, the ferrous band in CLOSED trigger 8 is not blocking the sensing portion of CLOSED sensor 5b, and as such, the electric field is not collapsed, resulting in no CLOSED signal being transmitted.

Conversely, in FIG. 3, the ferrous band included in OPEN trigger 7 is not blocking the sensing portion of OPEN sensor 5a, and as such, the electric field is not collapsed, resulting in no OPEN signal being transmitted. Likewise, in FIG. 3, the ferrous band in CLOSED trigger 8 is blocking the sensing portion of CLOSED sensor 5b, and as such, the electric field is collapsed, resulting in a CLOSED signal being transmitted.

FIG. 4 is a cut-away top view of actuated valve system 100 with cover 4 removed. Features illustrated in FIG. 4 include shaft 13, proximity sensor(s) 5, printed circuit board 11, and solenoid 12.

To assemble actuated valve system 100 to include valve position monitoring device 1, at least one proximity sensor 5 is mounted in sensor carrier 6. Connector 10, printed circuit board 11 (e.g., including a terminal strip), and solenoid 12, are also mounted onto/into sensor carrier 6. Sensor carrier 6 is mechanically fastened to actuated valve assembly 2 with shaft 13 protruding through a center hole in actuated valve assembly 2. CLOSED trigger 8 is then pushed onto shaft 13. OPEN trigger 7 and OPEN stop 9 are installed in a similar fashion. Electrical connections are also made.

To calibrate valve position monitoring device 1, an individual (e.g., an operator) pushes down on the OPEN trigger 7 until it hits a stop (i.e., CLOSED stop 9a). Then, the individual pulls up on OPEN trigger 7 until another stop is reached (e.g., OPEN stop 9). Cover 4 may then be installed (e.g., through a threading operation).

After calibration of valve position monitoring device 1, when valve assembly 3 and actuated valve assembly 2 are cycled, OPEN trigger 7 and CLOSED trigger 8 will self-align in front of proximity sensors 5. This self alignment is facilitated through the frictional coupling of OPEN trigger 7 and CLOSED trigger 8 with shaft 13. As stated above, when shaft 13 moves up and down during valve cycling, OPEN trigger 7 and CLOSED trigger 8 move up and down through the frictional coupling until they contact their corresponding stops. Thus, during cycling, OPEN trigger 7 and CLOSED trigger 8 realign through contact with their corresponding stops.

Depending on the configuration provided, the valve position can be monitored through a number of methods including, but not limited to, (a) visual monitoring of a local flag/beacon at the valve, (b) monitoring, either manually or through a control system, changes in the signal current from the sensors, or (c) monitoring of a network system, for example, using AS-Interface or DeviceNet protocol.

By integrating the range of motion of at least one of OPEN trigger 7 and CLOSED trigger 8 to be at least partially within actuated valve assembly 2, a reduced profile of the valve system is achieved. In existing switch pack technology, a manufacturer and/or provider of a valve actuator is typically different from a manufacturer and/or provider of a switch pack. Thus, the switch pack is designed to work with an existing valve actuator design, and often this results in a less than desirable configuration. According to the present invention, the actuated valve assembly 2 is designed with the position monitoring device 1 in mind. Thus, space within actuated valve assembly 2 is provided to integrally accept a portion of position monitoring device 1.

Additionally, a modular valve position monitoring device 1 is provided for providing valve position feedback signals. This modular valve position monitoring device 1 is relatively easy to assemble, service and/or replace in comparison to existing switch packs.

Although the present invention has been primarily described in terms valve position monitoring device 1 including two sensors 5 (i.e., an OPEN sensor and a CLOSED sensor), it is not limited thereto. A single sensor may be used to indicate a single position (e.g., OPEN or CLOSED) which may be adequate in certain applications. Alternatively, more than two sensors (e.g., redundant sensors) may be utilized in certain applications where valve position information is critical.

Although the present invention has been primarily described in terms using the existence or collapse of an electric field to generate valve position signals, it is not limited thereto. Various methods of determining the valve position are contemplated, so long as a portion of the range of motion of valve position monitoring device 1 extends into actuated valve assembly 2. Thus, although positioning of ferrous bands included in the moving triggers are disclosed for collapsing the electric field, this configuration is exemplary in nature. Alternative embodiments with different ferrous material configurations (i.e., not a band), or without a ferrous material at all, are also contemplated.

Although the present invention has been primarily described in terms of pneumatically-actuated valves, it is not limited thereto. The principles disclosed herein apply to a variety of actuation systems including, but not limited to, electrically actuated, mechanically actuated, and other actuation systems.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A valve position monitoring system comprising:
a valve assembly having an open and a closed position;
a valve actuator assembly comprising an actuator housing and a shaft operatively connected to said valve assembly for moving said valve assembly between its open and closed positions, the shaft axially moveable within a shaft bore defined through said actuator housing; and
a valve position monitor for detecting when said valve assembly is in the open or closed position, said valve position monitor comprising a first trigger carried on said shaft; and a first sensor housed within said shaft bore adjacent to said shaft within said actuator housing, said first sensor configured to sense when said first trigger is axially aligned therewith.

2. A valve position monitoring system in accordance with claim 1 wherein the valve position monitor further comprises a second trigger carried on said shaft axially spaced from said first trigger; and a second sensor located adjacent to said shaft and configured to sense when said second trigger is axially aligned therewith.

3. A valve position monitoring system in accordance with claim 2, wherein the axial spacing of said first and second triggers and of said first and second sensors are such that when the first trigger is axially aligned with the first sensor, the second trigger is axially spaced from the second sensor and when the second trigger is axially aligned with the second sensor, the first trigger is axially spaced from the first sensor.

4. A valve position monitoring system in accordance with claim 2, wherein the second sensor is at least partially housed within said shaft bore within said actuator housing.

5. A valve position monitoring system in accordance with claim 2 further comprising a stationary stop adjacent to each sensor.

6. A valve position monitoring system in accordance with claim 1, wherein said first trigger is axially moveable relative to the shaft and a first stationary stop is positioned within said actuator housing to limit the range of the first trigger in a first axial direction while said shaft is free to move relative to said first trigger is said first axial direction.

7. A valve position monitoring system in accordance with claim 6 wherein said first trigger is frictionally retained on said shaft.

8. A valve position monitoring system in accordance with claim 6 wherein said valve position monitor further comprises a second trigger frictionally retained on said shaft axially spaced from said first trigger; a second sensor configured to sense when the second trigger is axially aligned therewith; and a second stationary stop adjacent to the second sensor and configured to limit the movement of the second trigger in a second axial direction such that said shaft is free to move relative to said second trigger is said second axial direction.

* * * * *

UNITED STATES PATENT AND TRADEMARK OFFICE
CERTIFICATE OF CORRECTION

| | | |
|---|---|---|
| PATENT NO. | : 7,156,121 B2 | Page 1 of 1 |
| APPLICATION NO. | : 11/006077 | |
| DATED | : January 2, 2007 | |
| INVENTOR(S) | : Christopher L. Cox and Wayne R. Houck | |

It is certified that error appears in the above-identified patent and that said Letters Patent is hereby corrected as shown below:

Column 2, line 44, delete "the";
Column 2, line 48, delete "Is";
Column 2, line 50, delete "the" second occurance;
Column 3, line 12, "12" should be --20--
Column 3, line 18, delete "i"

Signed and Sealed this

Third Day of April, 2007

JON W. DUDAS
*Director of the United States Patent and Trademark Office*